United States Patent [19]
Martinelli et al.

[11] Patent Number: 6,098,138
[45] Date of Patent: *Aug. 1, 2000

[54] APPARATUS PROVIDING CONNECTIVITY BETWEEN DEVICES ATTACHED TO DIFFERENT INTERFACES OF THE APPARATUS

[75] Inventors: René Martinelli, Eybens; Gregory Mathes, Voreppe, both of France

[73] Assignee: Hewlett-Packard Company, Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/893,708

[22] Filed: Jul. 11, 1997

[30] Foreign Application Priority Data

Jul. 25, 1996 [EP] European Pat. Off. ............. 96410082

[51] Int. Cl.$^7$ ................................................... G06F 13/38
[52] U.S. Cl. ........................ 710/129; 710/102; 710/131; 710/38; 710/43; 709/227; 709/239; 709/250
[58] Field of Search ................................... 395/281–283, 395/308–309, 311, 851, 858, 863, 200.57, 200.6, 200.62, 200.78–200.8, 200.83; 713/320, 324; 709/239–242

[56] References Cited

U.S. PATENT DOCUMENTS

| | | | |
|---|---|---|---|
| 4,399,563 | 8/1983 | Greenberg | 455/607 |
| 4,999,794 | 3/1991 | Yakushiji | 364/707 |
| 5,005,937 | 4/1991 | Aida et al. | 350/96.16 |
| 5,142,624 | 8/1992 | Patrick | 395/200.3 |
| 5,237,698 | 8/1993 | Ohmae | 395/750.01 |
| 5,384,721 | 1/1995 | Joto | 364/707 |
| 5,457,801 | 10/1995 | Aihara | 395/750.01 |
| 5,553,249 | 9/1996 | Datwyle et al. | 710/128 |
| 5,590,285 | 12/1996 | Krause et al. | 709/250 |
| 5,594,576 | 1/1997 | Sutherland et al. | 395/118 |
| 5,638,521 | 6/1997 | Buchala et al. | 395/311 |
| 5,644,787 | 7/1997 | Nakamura et al. | 395/853 |
| 5,689,715 | 11/1997 | Crump et al. | 713/300 |
| 5,754,733 | 5/1998 | Robinson | 395/500 |
| 5,754,769 | 5/1998 | Harris Jr. et al. | 395/200.8 |
| 5,764,896 | 6/1998 | Johnson | 395/200.8 |
| 5,793,996 | 8/1998 | Childers et al. | 395/309 |
| 5,913,034 | 6/1999 | Malcolm | 709/223 |

FOREIGN PATENT DOCUMENTS

| | | |
|---|---|---|
| 0230351 | 7/1987 | European Pat. Off. . |
| 0567957 | 11/1993 | European Pat. Off. . |
| 0 725 330 A3 | 7/1996 | European Pat. Off. . |
| 89 01202 | 2/1989 | WIPO . |
| WO 94/13072 | 6/1994 | WIPO . |
| 94 18765 | 8/1994 | WIPO . |
| 94 22088 | 9/1994 | WIPO . |

OTHER PUBLICATIONS

AMD. *White Paper* "Magic Packet Technology" Pub. #20213, Issue Date: Nov. 1995.
AMD. *Application Note* "Magic Packet Technology Application in Hardware and Software" Pub. #20381, Issue Date: Mar. 1996.

*Primary Examiner*—Ayaz R. Sheikh
*Assistant Examiner*—Raymond N Phan

[57] ABSTRACT

A communications interface is provided for apparatus such as a desktop computer or printer. The communications interface provides both for connection to a network and connection to a local device that may be a portable computer, the two connections operating according to different protocol schemes. The communications interface permits the local device to communicate both with the main processing functionality of the apparatus and with the network. By providing standby power to the communications interface when the apparatus is switched off, the local device can continue to communicate with remote devices over the network even when the apparatus is off.

13 Claims, 4 Drawing Sheets

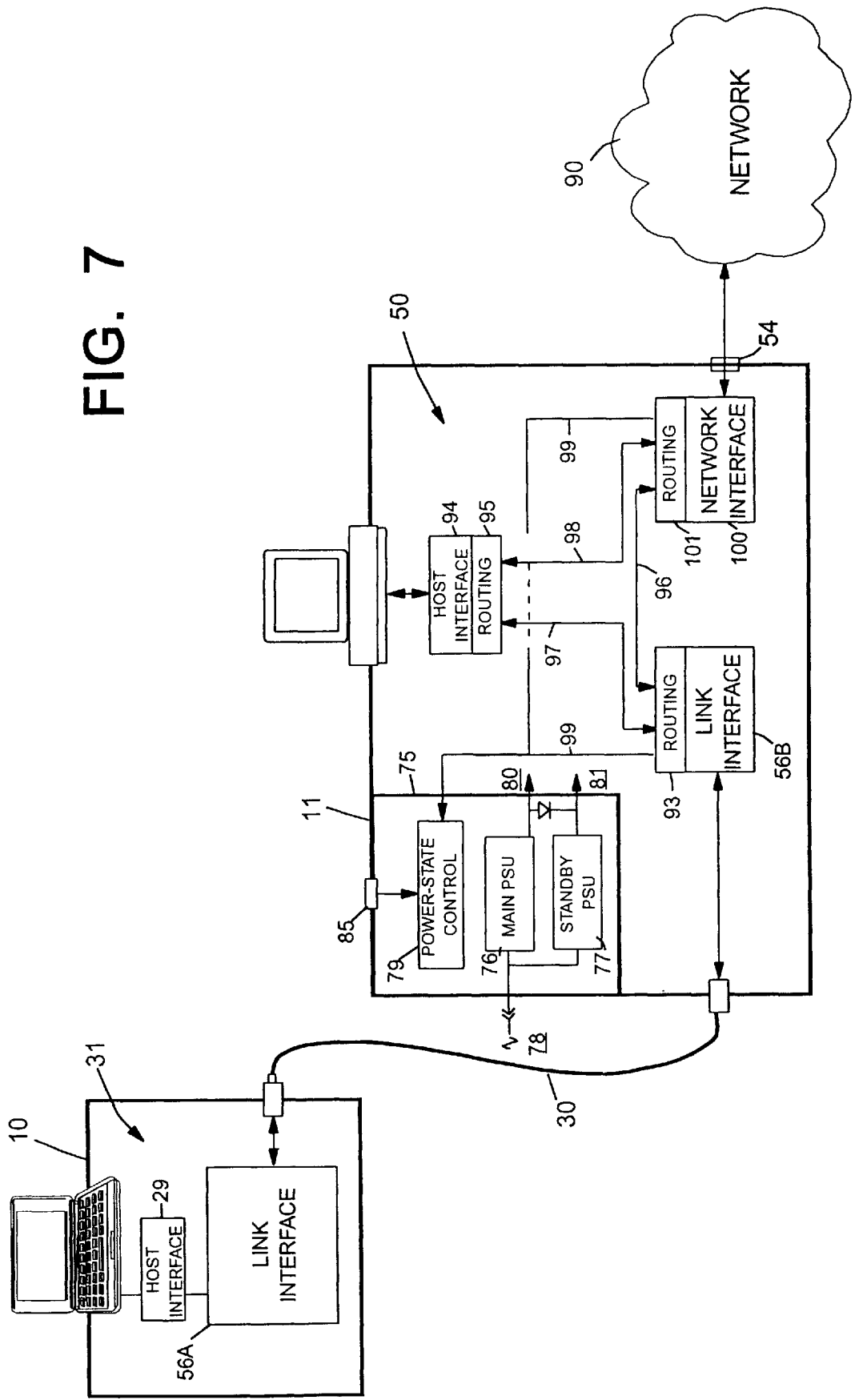

APPARATUS PROVIDING CONNECTIVITY BETWEEN DEVICES ATTACHED TO DIFFERENT INTERFACES OF THE APPARATUS

FIELD OF THE INVENTION

The present invention relates to apparatus (namely, desktop computer, portable computer, printer) providing connectivity between devices attached to different interfaces of the apparatus; in particular, but not exclusively, the present invention relates to a desktop computer having both a first interface for providing connection to a network and a second interface to which a portable computer can be attached to communicate both with the desktop computer and with devices connected to the network.

BACKGROUND OF THE INVENTION

Traditionally, desktop computers have been provided with two different types of external communication interface, namely peripheral interfaces (such as serial and parallel ports) for connecting local peripheral devices, and network interfaces for providing connectivity to a computer network to which other computers and shared resources are connected. For each type of interface connection, communication between the desktop computer and a connected device is effected according to a predetermined protocol scheme; however, the protocol schemes used for peripheral interfaces have generally been much simpler than for network connectivity. Thus peripheral connection schemes frequently did not have to deal with addressing problems as they provided for connection to one device and even if multiple devices were addressable only a very simple address space was used; in addition, protocol schemes used with peripheral interfaces have generally not been structured in multiple layers. In contrast, network protocols are highly structured and have fully developed adddressing schemes, typically using hardware device addresses of six bytes in length providing for global uniqueness of connected device addresses. Of course, these differences are not surprising due to the very different demands placed on peripheral connections and network connections, the former generally calling for large data transfers to/from local devices with the computer being the system master whereas the latter has in the past involved the transfer of smaller amounts of data often on a global basis with the computer having no pre-eminent position in the overall system.

Modern connection technologies such as Fibre Channel are, in fact, quite capable of supporting both high-speed local peripheral transfers and network connections through a single computer interface. However, the investment required to have a single connection technology serving the needs of a modem office is considerable and it seems likely that users will continue to demand appropriately tailored technologies for their peripheral and network interconnect requirements rather than a single solution that will be unnecessarily performant in some areas. This is particularly so in view of the heavy investment in existing network technologies. In other words, as the cost of upgrading a network to give a level a performance demanded by only some of the connected computers will be many times the cost of providing those computers with high-performance peripheral interconnects, the latter solution will often be the preferred one. It may therefore be expected that desktop computers will continue to need both specific network interfaces for the existing technologies and additional communication interfaces for supporting ever-more demanding local needs. It may also be noted that even though recent years have seen a trend to place expensive resources such as printers onto networks, as the prices of such devices continue to drop and users continue to experience the frustration of a network (or at least the relevant server) "going down" and depriving them of a shared resource, there can be discerned a reverse trend in which individual users are demanding their own local printers directly connected to their computers independently of any external network connection.

Another connectivity issue of increasing importance in recent times is the need of users of portable computers, such as frequent travellers, to exchange data between their portable computer and a desktop computer at their office or home. Traditionally, there are a number of ways this can be achieved. For example, the user could copy data from one computer onto a floppy disc, transfer this disc to the other computer, and then read in the data, always assuming that both computers have compatible floppy disc drives. The foregoing approach is obviously very inconvenient and a much more common approach, illustrated in FIG. 1 of the accompanying drawings, is to interconnect the portable and desktop computers 10, 11 through their serial or parallel ports using a suitable cable 12. Appropriate software running on both computers is then used to effect the desired data transfer. The drawback of this approach is that with current standard serial and parallel port designs, the data transfer rates are low and the mechanics of making the connection are cumbersome (the cables and cable connectors required being relatively substantial and the mating connectors provided on the computers being invariably located in inconvenient positions since for most usages, they are only infrequently accessed).

Another approach to providing inter-connection between a portable and a desktop computer is to use a "docking station" providing a relatively direct connection between the bus systems of the two computers; this generally enhances the data transfer rates achievable but at a significant cost premium in providing the docking station.

A further possibility is to use an infrared link between the two computers as illustrated in FIG. 2; in this case, both the portable computer 10 and the desktop computer 11 are provided with infrared transceivers 14 which when lined up with each other enable an infrared link 15 to be established giving high data transfer rates. This approach has in practice been found to be very sensitive to the correct alignment of the transceivers and cannot currently be considered a robust solution.

Yet another approach is to use a computer network to interconnect the portable and desktop computers. FIG. 3 illustrates one possible arrangement based on a 10BaseT network (see ANSI/IEEE 802.3 standards). In this case, each computer or other DTE (in FIG. 3, portable 10, desktop computers 11) is connected by two UTP (Unshielded Twisted Pair) lines to a corresponding port of a multiport repeater unit 20A, 20B. One UTP line 21 serves to transmit signals from the DTE to the repeater unit and the other UTP line 22 serves to transmit signals from the repeater unit to the DTE. Signals received by the repeater unit at any port are repeated on the outgoing lines of all other ports. FIG. 4 shows another network arrangement suitable for interconnecting a portable to a desktop computer. This arrangement which is described in WO-94/13072 (Farallon Computing) is also based around 10baseT network technology but now the repeater unit is effectively distributed over the network between a series of auto-crossover transceivers 25 in a way that allows daisy-chaining of the DTEs (in this case, computers 10 and 11A,B,C). Each transceiver is associated with a DTE and receives power from it when the DTE is switched on. When energised, the transceiver operates as a three port repeater, both transferring signals along the daisy-chain of transceivers and exchanging signals with its associated DTE over cable 27 that typically connects to the serial port of the DTE. Each transceiver includes bypass relays which maintain the daisy chain when the corresponding DTE is turned off resulting in de-energisation of the repeater circuitry of the transceiver. The transceiver 25 can be implemented either as a separate unit (as illustrated in FIG. 4 for computers 11A and 11C), or as a card insertable in a desktop computer (as for computer 11B). In FIG. 4, the portable computer 10 is shown attached at the end of the daisy chain, depending from the repeater 25 associated with computer 11A.

An advantage of providing inter-connectivity between a portable computer and a desktop computer by means of a network is that the same connection to the portable also enables the portable computer to communicate with the other devices connected to the network; if portable/desktop connectivity is provided through a peripheral interface to the desktop computer then, of course, a second connection would need to be made to the portable to establish a network connection. However, many of the existing installed network technologies are really only suited for network traffic profiles and do not cope efficiently with high speed, high volume data transfers. As already discussed above, it is unlikely that there will be a rapid chageover to more performant network technologies so that to achieve high performance in data transfers between a portable computer and a dektop computer, the most generally useful solution will be one using a specialised connection rather than a standard network connection.

Nevertheless, it is clear that from a user perspective, having to make only one connection for both desktop computer and network access is desirable. A further desirable feature so far as a portable-computer user is concerned would be the ability to make network connectivity to any convenient network regardless of the network technology and without the need to carry around interfaces for each network type.

It is an object of the present invention to provide apparatus having a communications interface satisfying at least some of the connectivity needs described above.

SUMMARY OF THE INVENTION

According to one aspect of the present invention, there is provided apparatus, being one of a desktop computer, portable computer and printer, comprising main processing functionality including a bus system, and communications means for enabling the main processing functionality to communicate with devices external to the apparatus, the communication means comprising:
  host interface means for interfacing the communications means with said main processing functionality via the bus system of the latter;
  first external interface means for providing external communication according to a first protocol scheme;
  second external interface means for providing external communication according to a second protocol scheme different from said first protocol scheme; and
  interconnection means for operatively interconnecting said host interface means said first external interface means and said second external interface means such as to permit a communication flow through any pairing of these interface means;

said first and second external interface means and said interconnection means together being operative to support a said communication flow between and through said first and second external interface means, with translation between said protocol schemes, without involving the said main processing functionality of said apparatus.

Generally, one of the external interface means will be a network interface and the other external interface means will be used to provide a specialised interface to a subsidiary device. In one preferred arrangement, the apparatus is a desktop computer and the subsidiary device is a portable computer. It may be noted that protocol translators are themselves well known, this being a function carried out in standard network routers; however, the incorporation of such functionality in the manner proposed into apparatus having a completely different primary function (printer, personal computing) has not been previously suggested.

Preferably, the apparatus further comprises a power provisioning system for powering the apparatus from an external power source, the power provisioning system having first and second states and comprising:
  user-operable power state control means for transitioning the power provisioning system between said first and second states,
  a main power supply for energising the apparatus including said main processing functionality when said power provisioning system is in its said first state and is connected to said external power source, and
  a standby power supply for energising the said first external interface means, said second external interface means and said interconnection means when the power provisioning system is in its said second state and is connected to said external power source whereby to permit communication between and through said first and second external interface means in such conditions.

With this arrangement, a device connected to one external interface means can communicate through to devices connected to the other external interface means even when the apparatus has apparently been turned off by the user. It will be noted that this continuity of connection despite apparatus turn off does not rely on providing power over the communications cabling as in some prior art proposals.

Advantageously, wake-up means are provided which are arranged to be energised by said standby power supply when the power provisioning system is in its said second state and is connected to said external power source, said wake-up means in these latter conditions being responsive to the receipt by either of said external interface means of an predetermined externally-provided signal, to transition the power provisioning means from its second state to its first state.

Where the second external interface means is a network interface, the interconnection means may be arranged to pass all communications with first external interface means through said second external interface means, said second external interface means comprising
  a first network adaptor connected to said host interface means,
  a second network adaptor connected to said first external interface means,
  a network media attachment unit for providing connection to said computer network, and
  a multiport repeater having at least three ports, a first said port being connected to said first network adaptor, a second said port being connected to said second network adaptor, and a third said port being connected to said network media attachment unit;

said first and second network adaptors being operative to send and receive addressed messages whereby said interconnection means is implemented by the appropriate addressing of messages by said adaptors.

Preferably, however, the interconnection means provides both a first path between said first external interface means and said host interface means and a separate second path between said first external interface means and said host interface means.

Again, where the second external interface means is a network interface for providing connection to a network, this network interface advantageously monitors the network destination addresses of messages on said network and:

receives from said network messages having a first predetermined network destination address and passes them via said interconnection means to said host interface means, and receives from said network messages having a second predetermined network destination address and passes them via said interconnection means to said first external interface means.

The network interface may be preprogrammed with both said first and second network destination addresses or may be preprogrammed with only said first destination address, the said second destination address being downloaded from a device connected to said first external interface means as required.

BRIEF DESCRIPTION OF THE DRAWINGS

Embodiments of the invention will now be described, by way of non-limiting example, with reference to the accompanying diagrammatic drawings, in which:

FIG. 7 is a diagram of a third embodiment of the invention.

BEST MODE OF CARRYING OUT THE INVENTION

Figure 1:
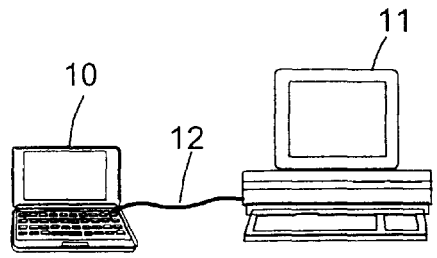
FIG. 1 is a diagram of a prior art arrangement for inter-communicating a portable computer with a desktop computer through a serial or parallel cable.
Figure 2:
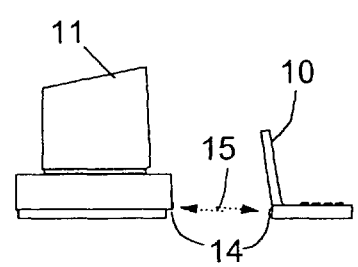
FIG. 2 is a diagram of a prior art arrangement for inter-communicating a portable computer with a desktop computer through an infrared link.
Figure 3:
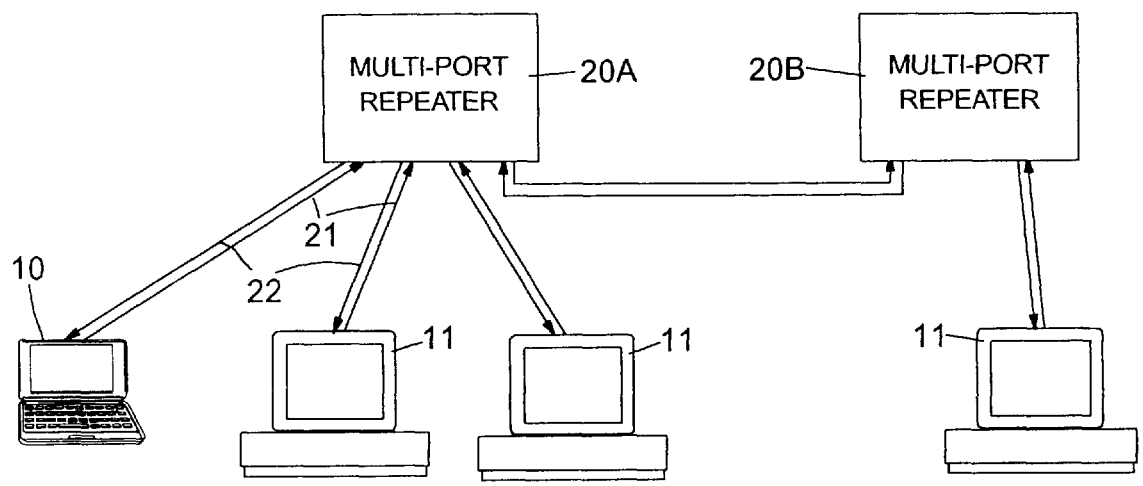
FIG. 3 is a diagram of a prior art arrangement for inter-communicating a portable computer with a desktop computer through a standard 10BaseT network.
Figure 4:
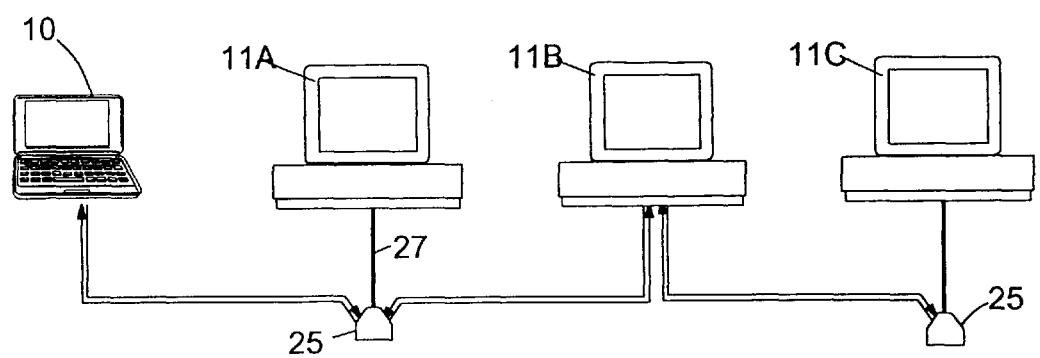
FIG. 4 is a diagram of a prior art arrangement for inter-communicating a portable computer with a desktop computer through a 10BaseT type network using a daisy chain of auto-crossover transceivers.
Figure 5:
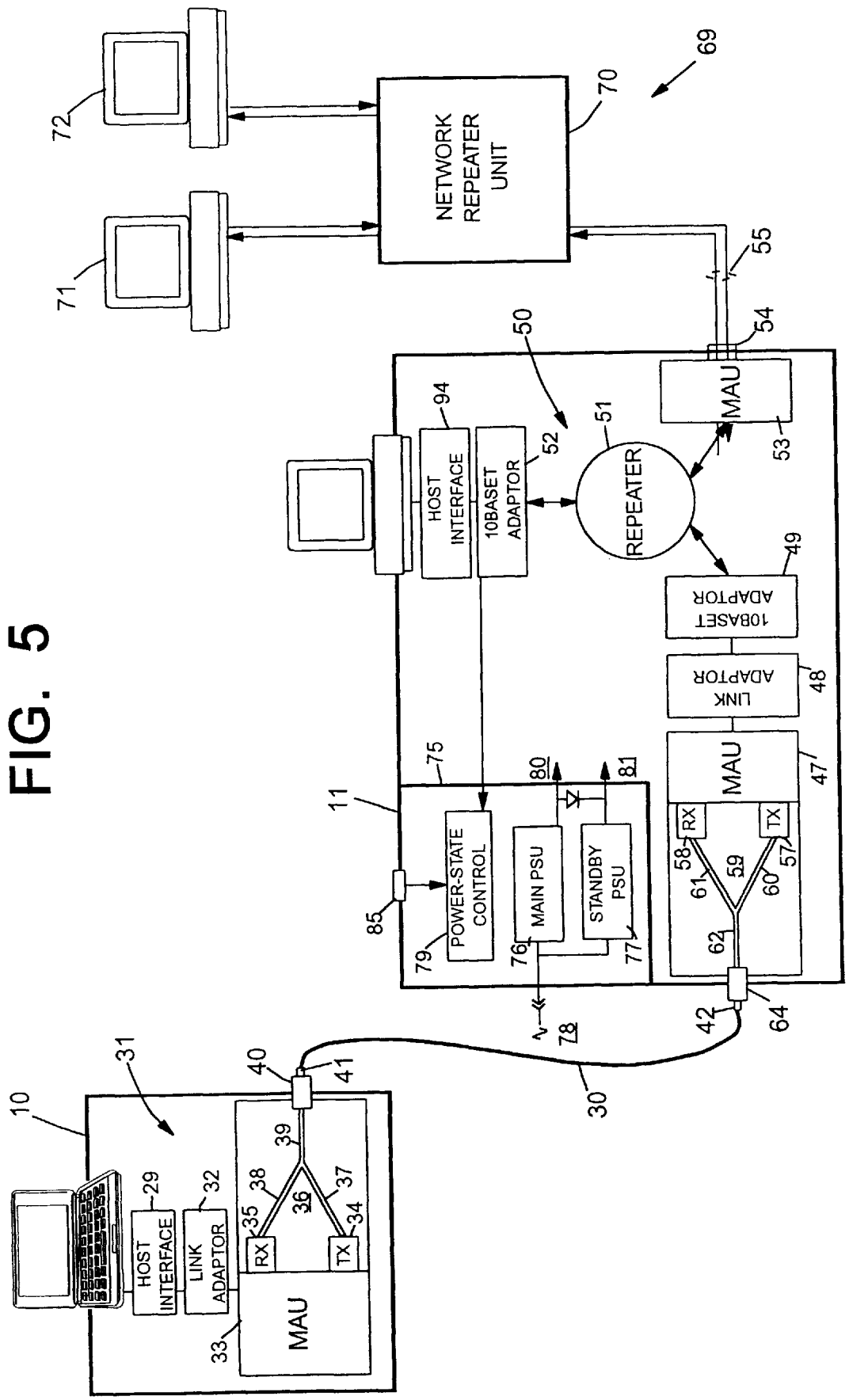
FIG. 5 is a diagram of a first embodiment of the invention inter-communicating a portable computer with a desktop computer using a single fiber-optic cable.

FIG. 5 shows an embodiment of the present invention in which a portable computer 10 is connected to a desktop computer 11 through a fiber-optic cable link 30 for communication both with the desktop computer 11 itself and also with a 10BaseT network 69 to which the computer 11 is connected. In the following description only those portions of the computers 10, 11 relevant to the present invention are described.

The portable computer 10 includes a communications interface functional unit 31 housed within the computer 10. The interface unit 31 comprises a host interface 29 that provides an interface to the main processing circuits of computer 10 (such as its processor subsystem, not separately shown); a link adaptor 32 here directly connected to the host interface 29; a MAU 33 connected to the adaptor 32; and an externally-accessible connector 40. The MAU 33 includes an optical transmitter 34, an optical receiver 35, and an optical coupler 36 having first and second arms 37, 38 respectively interfacing with the optical transmitter and receiver 34, 35, and a leg 39 with which the arms 37, 38 unite. The connector 40 is a pluggable optical connector interfacing with the free end of the leg 39. A complementary optical connector 41 on one end of the cable 30 releasably engages in the connector 40.

The desktop computer 11 also includes a communications interface functional unit 50 housed within the computer 11 and typically in the form of an expansion card plugging into the peripheral bus (for example, PCI bus) of the computer. The interface unit 50 comprises a three-port repeater 51;

a first 10BaseT adaptor 52 and host interface 94 that serve to interface the main processing functionality of computer 11 (its processing subsystem, memory subsystems and bus systems) with a first port of the repeater 51 (the host interface connecting with a bus system, typically the peripheral bus, of the main processing functionality);

a first MAU 53 connected to a second port of the repeater 51 and interfacing via connector 54 with a standard 10BaseT dual UTP cable 55 to provide network connectivity for the computer 11; and a link interface chain made up of a second 10BaseT adaptor 49 connected to the third port of the repeater 51, a link adaptor 48 and a link MAU 47, and an externally pluggable optical connector 64.

The MAU 47 includes an optical transmitter 57, an optical receiver 58, and an optical coupler 59 having first and second arms 60, 61 respectively interfacing with the optical transmitter and receiver 57, 58, and a leg 62 with which the arms 60, 61 unite; the optical connector 64 interfaces with the free end of the leg 62. A complementary optical connector 42 on the corresponding end of cable 30 releasably engages in the connector 64.

With this arrangement, a link is provided by which data can be exchanged between the portable computer 10 and desktop computer 11 with the data passing to the main processing functionality of the computer 11 through the network adaptor 52 and host interface 94. The link between the computers 10 and 11 is effected according to the protocols run by the link adaptors 32, 48 with MAUs 33 and 47 adapting the link signals to the physical transmission medium, namely the duplex optical cable 30. The data flow between the link adaptor 48 and the main processing circuits of the computer 11 is achieved by using the network interface of the computer, link adaptor 48 being connected to the 10BaseT adaptor 49 which in turn connects to the repeater 51 and thus on through to the network adaptor 52 and host interface 94.

Physically setting up the connection between the computers 10 and 11 is very simple as it only requires the cable 30 to be plugged into connectors 40 and 64, there being no need to consider crossovers since the same cable carries the signals passing in both directions. By providing the optical coupler 36 and 59 as part of the communication interfaces 31 and 50 housed within the computers 10 and 11 respectively, a user is only presented with a single connector on each computer which makes the arrangement suitable for use even by novice users.

With the FIG. 5 arrangement, not only can the desktop computer 11 communicate through the adaptor 52, repeater 51 and MAU 53 with a network (in the present example, a standard 10BaseT network 69 represented by a repeater unit 70 and two DTEs 71, 72), but the portable computer 10 can also communicate with this network via cable 30, MAU 47, adaptors 48 and 49, repeater 51 and MAU 53. It will be noted that the communication of computer 10 with network 69 through interface 50 does not involve the main processing circuits of computer 11 (including its bus systems).

From one point of view, in the FIG. 5 embodiment the link made up of the adaptor 32, MAU 33, cable 30, MAU 47 and adaptor 48 serves to intercommunicate the network adaptor 49 of computer 11 with higher-level, generally software-based, communications functionality of computer 10 for the sending and receiving of messages by computer 10. The protocol run across this link must therefore be capable of exchanging service primitives between the higher-level communications functionality of computer 10 and the network adaptor 49. From another point of view, the adaptors 48 and 49 together serve as a protocol translator translating between the protocols used over the optical link and the network.

One important piece of information that needs to be passed over the link from computer 10 to the network adaptor 49 is the destination address of any message being sent by computer 10. Of course, the portable computer 10 in sending a message to any device connected to the network 69, including to the computer 11 (that is, to the adaptor 52 for access by the main processing circuits) could simply use the appropriate network address for the device concerned. This network address may be the actual hardware MAC address associated with the device (in the case of computer 11, this would be an address associated with adaptor 52) or a higher level address such as an IP address. Knowledge of the network address of computer 11 could be previously stored in computer 10 or downloaded from the communications interface 50 of computer 11 as part of an initialisation process executed when cable 30 is plugged in and both communication interfaces 31 and 50 energised.

However, as an alternative to the portable computer knowing the address of adaptor 52, the portable computer could simply mark each message intended for computer 11 with a predetermined indicator that would be the same for any computer 11 including a communications interface 50 of the FIG. 5 form. One possible form of this marking is a simple tag that would be recognised by the adaptor 48 or 49 and converted into the address of adaptor 52 before the adaptor 49 launched the message concerned towards repeater 51. Another possible way of marking a message for the adaptor 52 would be to use a fixed address that the adaptor 52 would always recognise as for itself (in addition to the address normally associated with the adaptor); in this case, in order to stop the message being received by other computers on network 69 that are of similar form to computer 11, either the repeater 51 or MAU 53 must be arranged to block transmission of the message concerned out onto the network 69 from computer 11.

As regards the sending of messages from the main processing circuits of computer 11 through the interface 94 and adaptor 52 to the computer 10, the network adaptor 49 will generally have its own MAC address that it will include in messages it sends out through repeater 51, this address then being used for return messages. An alternative to using a MAC address preassigned to adaptor 49, is for the portable to have its own preassigned MAC address which it downloads to network adaptor 49 for use by the latter. As another possibility, rather than the computer 11 addressing messages to a specific address associated with the adaptor 49, an arrangement could be used in which the adaptor 52 sends messages intended for portable 10 to a fixed address that is recognised by adaptor 49 in addition to its own address, messages so addressed being blocked from transmission out onto the network 69.

The protocols used to communicate the computer 11 with the computer 10 and with the network 11 will generally be different. Thus the link between the computers 10 and 11 may utilise the ANSI Fibre Channel Protocol although other protocol schemes are equally possible according to the performance/cost criteria to be met as will be apparent to persons skilled in the art. With regard to the network protocol scheme used this will generally be dictated by the network environment in which the desktop computer is required to operate; thus, for example, the network protocols used may be those of the 10BaseT standard or any other standard network protocol scheme. With regard to protocol implementation in the desktop computer 11, it will usually be possible to integrate the design of the two protocol adaptors 48 and 49 to optimise performance so that there may well not exist a clear boundary between these two elements.

Of course, with the FIG. 5 arrangement in which communication with the portable computer 10 from the main processing circuits of the computer must first pass through the network environment established by adaptor 52, repeater 51 and adaptor 49, certain of the advantages of being able to run a different protocol over link 30 are lost. Nevertheless, the FIG. 5 arrangement offers the portable user enhanced ease of network access because it is the desktop computer that must concern itself with the specifics of the network enabling the portable user to plug into any desktop computer provided with a link 30 in order to gain network access (it being assumed that the same protocol scheme is operated on link 30 for all computers so equipped).

A further feature of the desktop computer 11 of FIG. 5 is that the communications interface unit 50 is arranged to be powered from a standby power supply 77 when the computer 11 has been turned off by the user; this permits the portable computer 10 to communicate with the network 69 even when the computer 11 is turned off. More particularly, the computer 11 includes a power provisioning system 75 comprising a main power supply 76 and a standby power supply 77 both intended to run off an external power source 78. The power provisioning system 75 further comprises a powerstate control unit 79 having first, second and third states. The unit 79 resides in its first state when the computer 11 is disconnected from the external power source 78; in this first state, neither supply 76 or 77 is energised and all circuits of the computer are inactive (in fact, an internal power source is used to maintain certain key circuits, including the unit 79 and, generally, a real time clock). When the external power source 78 is connected, the control unit will reside in either its second or its third state. In the second state of the unit 79, only the standby supply 77 provides an output at 81 and this output is used to power the communications interface 50; in this second state the computer 10 can therefore communicate with network 69 through the communications interface 50 without the main circuits of the computer 11 being powered up. In the third state of the unit 79, the main supply 77 provides an output at 80 that powers all the circuits of the computer enabling the computer 10 to communicate with the main processing circuits of computer 11 as well as with network 69. A user-operable front panel switch 85 serves to toggle the power-state control unit 79 between its second and third states as commanded by the user (software activated turnoff is also feasible). The unit 79 automatically transits to its first state when the external power source 78 is disconnected. On reconnection of the power source 78, the unit 79 may be arranged always to come up in its second state; alternatively, the unit 79 can be provided with a memory holding its state (second or third state) at the moment of disconnection of the power source 78 and, in this case, on reconnection the unit 79 can be placed in this memorised state.

The control unit 79 may also be moved from its second (standby) state to its third (on) state by receipt of a special predetermined packet by the adapter 52 over the network 69 or from the portable computer 10. Thus, plugging in the portable computer 10 to the computer 11 using cable 30 and sending the predetermined packet from computer 10 to computer 11, can be arranged to wake up the computer 11 from its second standby state to its third, on, state; upon cessation of communication between the computers (as, for example, determined by inactivity for a given period), the control unit 79 can be arranged to transit back to its second state.

Figure 6:
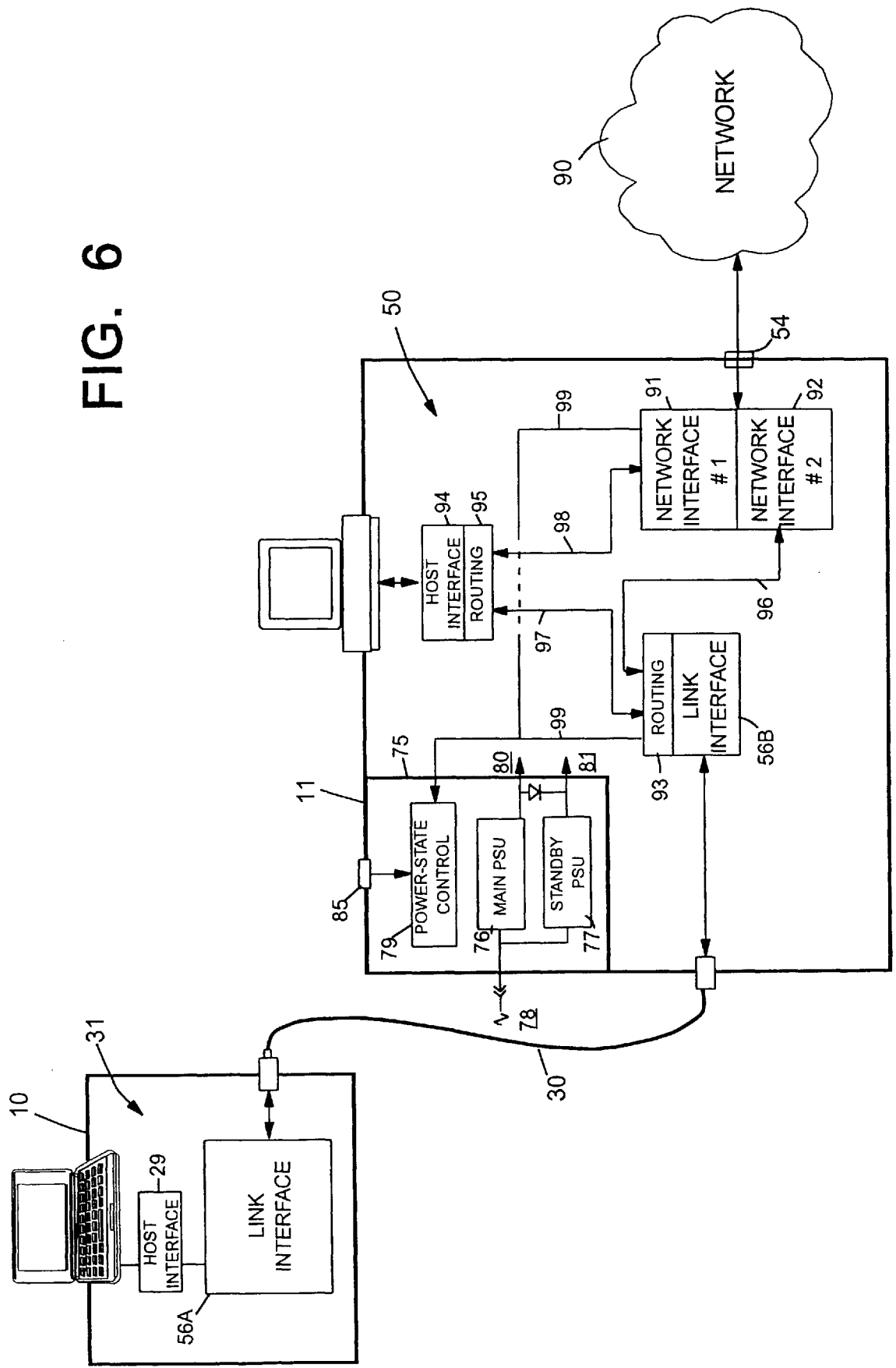
FIG. 6 is a diagram of a second embodiment of the invention.

A second embodiment of the invention is shown in FIG. 6, this embodiment being similar to that of FIG. 5 but differing in respect of certain of the details of communications interface 50 of computer 11. In addition, the network 90 to which the computer 11 is connected through connector 54 has been generalised to be any network type. As regards the link adaptor 32 and MAU 33 of computer 10 in FIG. 5, these have been combined in FIG. 6 into a link interface block 56A; similarly, link adaptor 48 and MAU 47 have been combined into link interface 56B.

The communications interface 50 of the FIG. 6 embodiment includes two network interfaces 91, 92 providing separately-addressable ports onto network 90. The network interface arrangement illustrated in FIG. 6 is not intended to call for any particular architecture and covers, for example, the FIG. 5 configuration where network adaptors 52 and 49 provide two addressable network ports that are united through repeater 41; other configurations are also possible such as an internal network bus segment to which interfaces 91 and 92 are separately connected.

A feature of the FIG. 5 embodiment is that communication between the computers 10 and 11 uses the network interface of computer 11 so that, except in the special arrangement mentioned where the repeater 51 or MAU 53 blocks the transmission onto network 69 of traffic between computers 10 and 11, this traffic will be sent out over the network which may be undesirable from the point of view both of network loading and security. In the FIG. 6 embodiment, this situation is avoided by providing separate paths in communications interface 50 for network messages and messages flowing between computers 10 and 11. More particularly, link interface 56B is provided with routing functionality (block 93) that recognises whether a message coming from computer 10 is intended for the main processing circuits of computer 11 or for transmission over the network 90; in the the former case the message is passed over path 97 to host interface 94 whereas in the latter case the message is passed over path 96 to network interface 92. The host interface 94 also includes routing functionality (block 95) for recognising whether a message coming from the main processing circuits of computer 11 is intended for computer 10 or for transmission over the network 90; in the the former case the message is passed over path 97 to the link interface 56B whereas in the latter case the message is passed over path 98 to network interface 91. It will be appreciated that the paths 96, 97 and 98 are logical paths and not necessarily physical paths. It will also be appreciated that blocks 93 and 95 include arbitration functionality for handling the situation where messages are simultaneously available from more than one source.

It may be noted that messages passing between the computer 10 and network 90 (in either direction) undergo a protocol translation in passing through the interfaces 56B and 92 to adapt the messages to the protocols being used over link 30 and network 90 respectively. This protocol translation can, of course, be effected by passing each message up the protocol stack of one interface and then down the protocol stack of the other interface; however, if the interface 56B is arranged to recognise at a low level messages intended for the network 90, then a more direct protocol translation can be effected between interfaces 56B and 92. It would, of course, still be necessary to pass messages exchanged between the computer 10 and the host interface 94 through the full protocol stack run by interface 56B.

Whilst the host interface 94 has been described as providing a single access point to the main processing circuits of the computer 11, it would also be possible for interface 94 to provide separate access points (for example, peripheral bus interfaces) for connecting paths 97 and 98 to the main processing circuits. In this case, routing block 95 would not be required as the main processing circuits would route messages to the appropriate access point.

A significant advantage of the FIG. 6 arrangement as opposed to that of FIG. 5 is that it is possible to match the characteristics of path 97 to those of link 30; more particularly, since link 30 is an optical link it is capable of supporting very high data rates and the path 97 can be designed to support similar rates. For the FIG. 5 embodiment, the network technology serves to restrict the overall performance achievable through link 30.

The FIG. 6 embodiment includes the same power provisioning system 75 as the FIG. 5 embodiment except that now transitioning the system from its second state (standby supply energised) to its third state (main supply energised), is effected when either the block 93 associated with the link interface 56B or the network interface 91 recognises a special wake-up message destined for the computer 11. Upon recognition of such a message, a wake-up signal is passed over line 99 to the power-state control block 75. It may be noted that when the power-provisioning system is in its second state, only the blocks 56B, 91, 92 and 93 need be energised from the standby supply.

FIG. 7 shows a third embodiment of the present invention which is similar to the FIG. 6 embodiment except that now the communications interface 50 of computer 11 is provided with only one network interface 100 which is used by both the main processing circuits of computer 11 and by computer 10 to connect with network 90. In this case, the network interface 100 is also provided with routing functionality (block 101) for recognising whether a message received over network 90 is intended for the main processing circuits of computer 11 or for computer 10. This recognition may be based on the inclusion in the message of an appropriate indicator (such as subsystem number) but can be most conveniently done by having the network interface respond to two separate network addresses, one associated with the main processing circuits of computer 11 and the other with the path to computer 10—in this case, the message address indicates to block 101 the correct routing.

It will be appreciated that the embodiments of FIGS. 5, 6 and 7 are simply illustrative of the present invention and many variants are possible. Thus, although the communication interfaces 31 and 50 have been illustrated as distinct subsystems of the computers 10 and 11, it will be appreciated that physically they may be implemented on the motherboards of these computers with their circuitry integrated into chips including other circuitry of the computer. In the case of computer 11 at least, the communications interface would still be logically distinct from the main functionality of the computer so that the latter is not involved in transfer of data between the computer 10 and the network 69/90. The communications interface 31 of the portable computer 10 may also be implemented in an externally-accessible plug-in module, such as a PCMCIA module, the computer 10 including a corresponding slot into which the module engages.

Furthermore, whilst the 2:1 couplers 36, 59 shown in FIG. 5 are depicted as guided wave devices, it will be appreciated that bulk optic devices can also be used, the basic functional requirement being for a coupler having receive and transmit ports that are optically coupled to a bidirectional port. It will also be appreciated that reference to optical devices refers to devices for handling those wavelengths used in optical communications, whether or not in the visible spectrum.

Although the link 30 has been described as a particular form of optical link, in fact any type of link connection can be used as appropriate to the performance/cost requirements and persons skilled in the art will readily be able to identify suitable alternative connection technologies for link 30 including, for example, the IEEE 1394 standard.

Although in the described embodiments the portable computer 10 connects only to the computer 11, it would be possible to provide for connection to other devices and to this end the communications interface 31 could take the same form as the communications interface 50 of computer 11 but preferably with the same communication protocol running on each connection.

As well as facilitating the connection to portable computers, the present invention can also be used to facilitate connection to other electronic data-handling equipment such as PDAs (Personal Digital Assistants); thus the present invention can be used to connect a PDA to a desktop computer or, indeed, to a portable computer itself provided with a communications interface 50. Another possibility is to connect a printer to computer 11 over link 30; in this case, the printer is a local printer for computer 11 but can also serve as a network printer for other computers even if computer 11 is switched off. Indeed, the printer could be provided with a communications interface 50 in which case it would be directly connected to a network and then its link interface could be used to provide connection to the printer and to the network for a desktop computer, a portable computer, a PDA or any other such device.

It will be appreciated that the term "desktop" computer as used herein is to be interpreted broadly as including tower computer arrangements as well as computers actually intended to sit on a desktop.

We claim:

1. Apparatus, being one of a desktop computer, portable computer and printer, comprising:
    main processing functionality including a bus system, and
    a communications facility for enabling the main processing functionality to communicate with devices external to the apparatus, the communication facility including:
        a host interface for interfacing the communications facility with said main processing functionality via the bus system;
        a first external interface for providing external communication according to a first protocol scheme;
        a second external interface for providing external communication according to a second protocol scheme different from said first protocol scheme; and
        interconnections for operatively interconnecting said host
    interface, said first external interface, and said second external interface, such as to permit a communication flow through any pairing of these interfaces;
    said first and second external interfaces and said interconnections together being operative to support communication flow between and through said first and second external interfaces, with translation between said different protocol schemes, without either involving said main processing functionality of said apparatus or precluding initiation of a communication between the main processing functionality of said apparatus and said first or second external interfaces.

2. Apparatus according to claim 1, further comprising a power provisioning system for powering the apparatus from an external power source, the power provisioning system having first and second states and including:
    user-operable power state control means for transitioning the power provisioning system between said first and second states,
    a main power supply for energising the apparatus including said main processing functionality when said power provisioning system is in its said first state and is connected to said external power source, and
    a standby power supply for energising said first external interface means, said second external interface means and said interconnection means when the power provisioning system is in its said second state and is connected to said external power source whereby to permit communication between and through said first and second external interface means.

3. Apparatus according to claim 2, further comprising wake-up means arranged to be energised by said standby power supply when the power provisioning system is in its said second state and is connected to said external power source, said wake-up means being responsive, to receipt by either of said external interface means of a predetermined externally-provided signal, to transition the power provisioning means from its second state to its first state.

4. Apparatus according to claim 1, wherein said first external interface means provides connection to a subsidiary device and a said second external interface means provides connection to a computer network.

5. Apparatus according to claim 4, wherein said first external interface means includes:
    a media attachment unit including an optical transmitter, an optical receiver, and a optical coupler, the optical coupler having a transmit port interfacing with the optical transmitter, a receive port interfacing with the optical receiver, and a bidirectional port optically coupled to both the transmit and receive ports, and
    optical connection means for connecting a duplex fiber-optic cable to said bidirectional port of the coupler of the network interface means.

6. Apparatus according to claim 4, wherein said interconnection means passes all communications with first external interface means through said second external interface means, said second external interface means comprising:
    a first network adaptor connected to said host interface means, a second network adaptor connected to said first external interface means, a network media attachment unit for providing connection to said computer network, and a multiport repeater having at least three ports, a first said port being connected to said first network adaptor, a second said port being connected to said second network adaptor, and a third said port being connected to said network media attachment unit;

said first and second network adaptors being operative to send and receive addressed messages whereby said interconnection means is implemented by addressing of messages by said adaptors.

7. Apparatus according to claim 6, wherein one of said multiport repeater and network media attachment unit is operative to block transmission out onto said network of messages passing between and through said first and second network adaptors.

8. Apparatus according to claim 1, wherein said interconnection means provides both a first path between said first external interface means and said host interface means and a separate second path between said first external interface means and said host interface means.

9. Apparatus according to claim 1, wherein said second external interface means is a network interface for providing connection to a network, said network interface being operative to monitor network destination addresses of messages on said network and:

to receive from said network messages having a first predetermined network destination address and to pass them via said interconnection means to said host interface means, and to receive from said network messages having a second predetermined network destination address and to pass them via said interconnection means to said first external interface means.

10. Apparatus according to claim 9, wherein said network interface is preprogrammed with said first and second predetermined destination addresses.

11. Apparatus according to claim 9, wherein said network interface is preprogrammed with said first predetermined destination address and is operative to receive and temporarily store said second predetermined destination address from a device connected to said first external interface means.

12. Apparatus according to claim 2, wherein said first external interface means provides connection to a subsidiary device and a said second external interface means provides connection to computer network.

13. Apparatus according to claim 3, wherein said first external interface means provides connection to a subsidiary device and a said second external interface means provides connection to computer network.

* * * * *